United States Patent
Angood et al.

(10) Patent No.: US 7,168,290 B2
(45) Date of Patent: Jan. 30, 2007

(54) ALIGNING COMPONENTS OF A MEASURING SYSTEM

(75) Inventors: Stephen M. Angood, Gloucestershire (GB); David R. McMurtry, Gloucestershire (GB)

(73) Assignee: Renishaw PLC, Gloucestershire (GB)

( * ) Notice: Subject to any disclaimer, the term of this patent is extended or adjusted under 35 U.S.C. 154(b) by 78 days.

(21) Appl. No.: 10/501,475

(22) PCT Filed: Jan. 16, 2003

(86) PCT No.: PCT/GB03/00175

§ 371 (c)(1),
(2), (4) Date: Jul. 14, 2004

(87) PCT Pub. No.: WO03/062747

PCT Pub. Date: Jul. 31, 2003

(65) Prior Publication Data

US 2005/0076702 A1    Apr. 14, 2005

(30) Foreign Application Priority Data

Jan. 16, 2002    (GB) ................. 0200925.6

(51) Int. Cl.
*G01B 5/04*    (2006.01)
*G01B 5/008*    (2006.01)

(52) U.S. Cl. ............................ 73/1.79; 73/1.75; 33/286

(58) Field of Classification Search ................. 73/1.75, 73/1.79; 33/289, 286; 248/346.03, 346.05, 248/316.16; 356/138, 399, 401
See application file for complete search history.

(56) References Cited

U.S. PATENT DOCUMENTS

| 4,278,381 A | | 7/1981 | Blomquist |
| 4,518,855 A | | 5/1985 | Malak |
| 4,925,288 A | | 5/1990 | Harris |
| 4,939,678 A | | 7/1990 | Beckwith, Jr. |
| 5,362,108 A | | 11/1994 | Hrvatin |
| 5,435,072 A | * | 7/1995 | Lloyd et al. ................ 33/559 |
| 5,507,097 A | | 4/1996 | Duey et al. |
| 5,971,903 A | * | 10/1999 | Hajdukiewicz ............... 483/1 |
| 6,047,612 A | * | 4/2000 | McMurtry ................ 74/490.06 |

FOREIGN PATENT DOCUMENTS

| EP | 0 529 182 A1 | 3/1993 |
| WO | WO 02/04890 A1 | 1/2002 |

* cited by examiner

*Primary Examiner*—Hezron Williams
*Assistant Examiner*—David A. Rogers
(74) *Attorney, Agent, or Firm*—Oliff & Berridge, PLC

(57) ABSTRACT

A measuring system for calibrating a machine in which a base (10) is attachable to a surface of the machine and a housing (20) is mountable on the base, wherein at least one surface of the base and at least one surface of the housing are each provided with a complementary part of a mounting device, such that when the two parts of the mounting device are connected together, the housing may be aligned in any of a plurality of predetermined directions. The base includes a lifting mechanism (64) which when lowered allows the complementary parts of the mounting device (93, 95) of the housing (20) and the base (10) to be in contact and when raised causes them to at least partly break contact with one another. The level of the base (10) may be adjusted using a system of balls and tapered rollers.

8 Claims, 19 Drawing Sheets

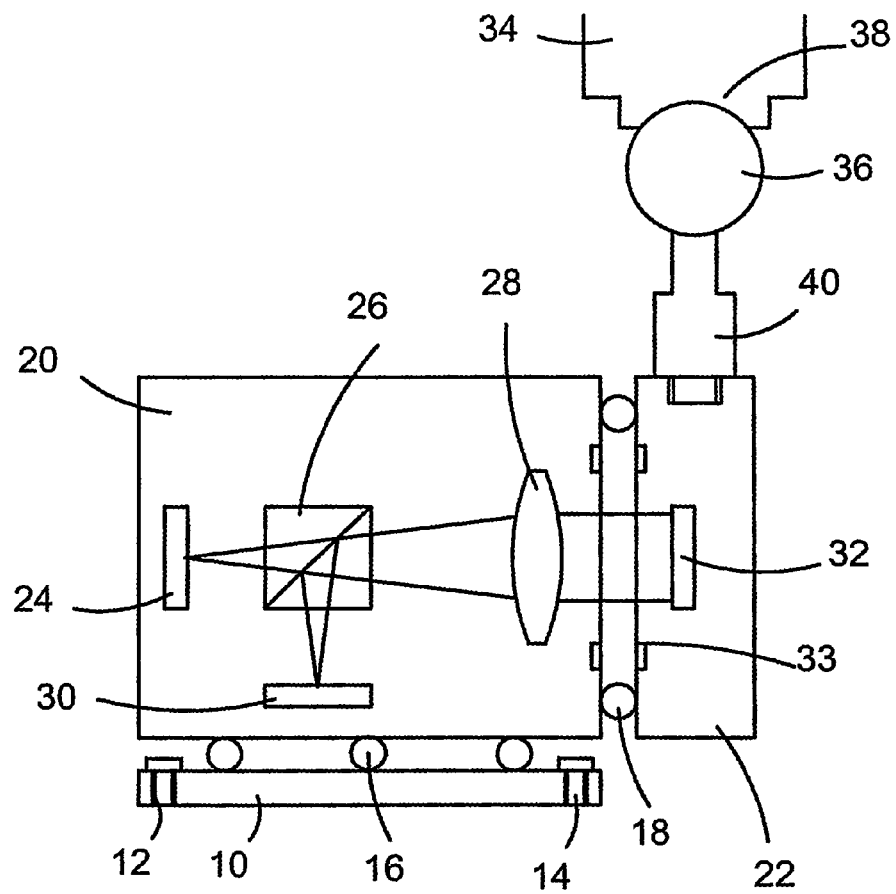
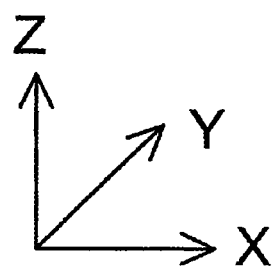
Fig 1 (PRIOR ART)

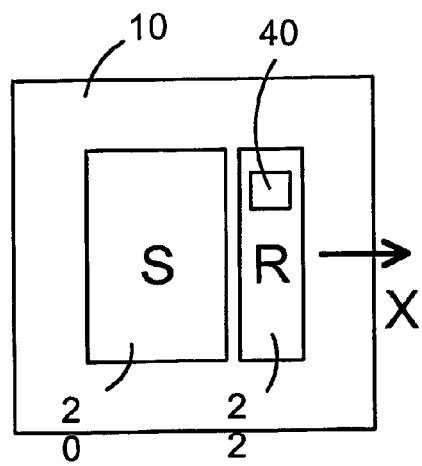
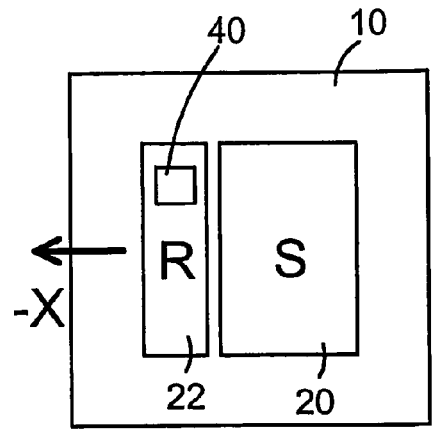
Fig 3A    Fig 3B
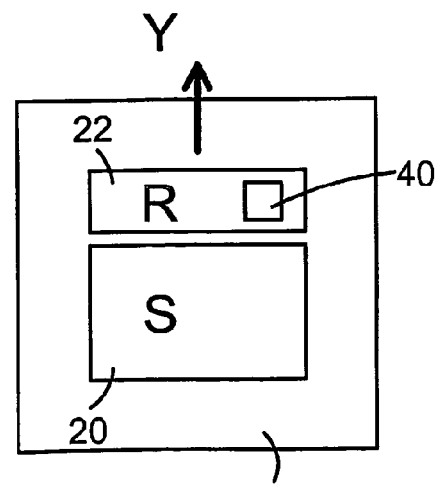
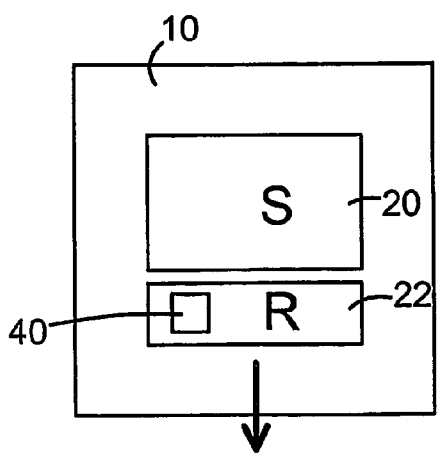
Fig 3C    Fig 3D
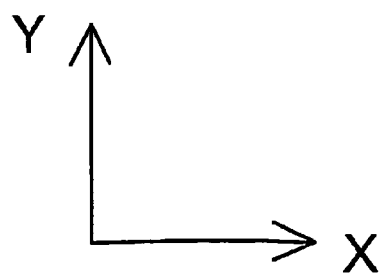

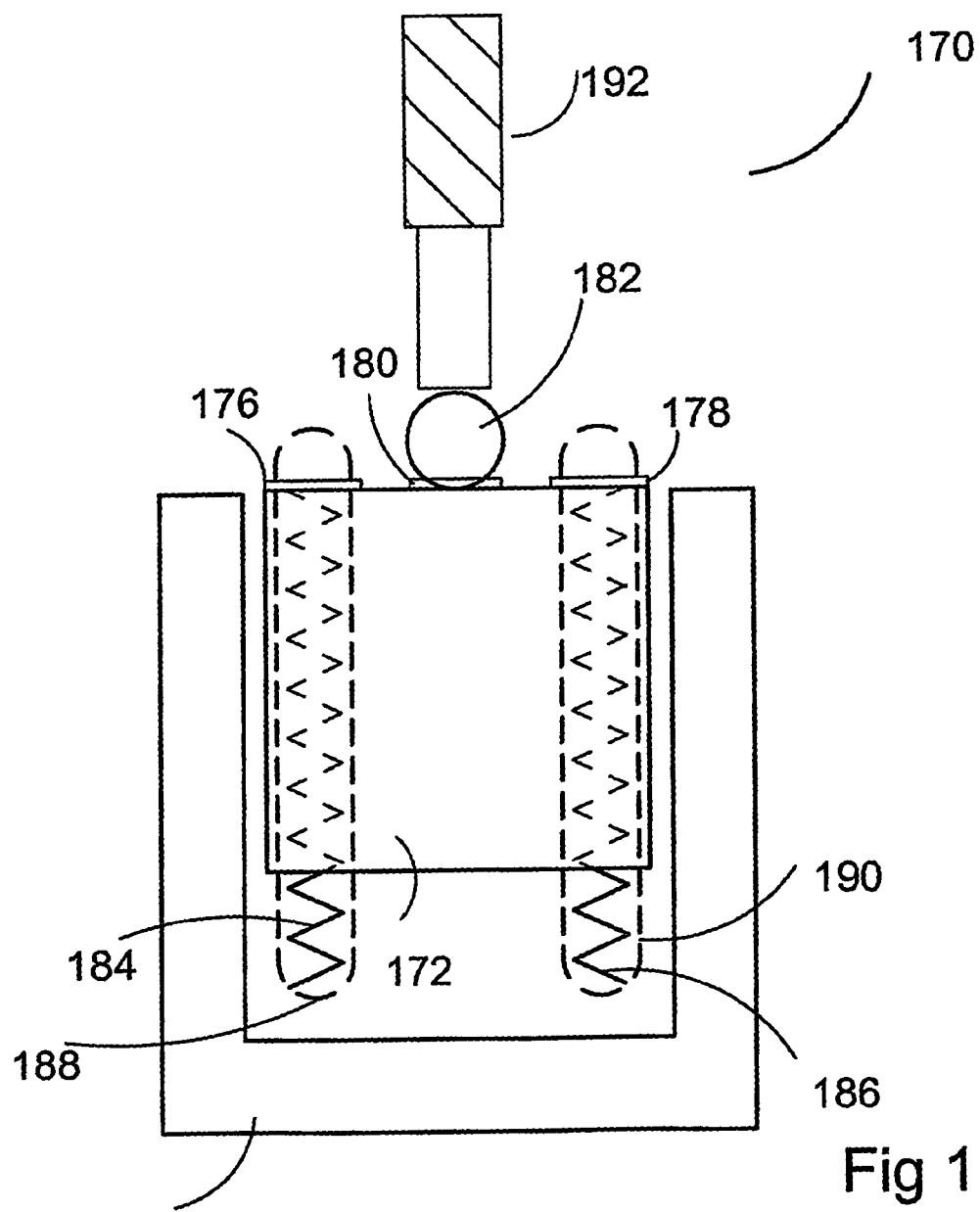
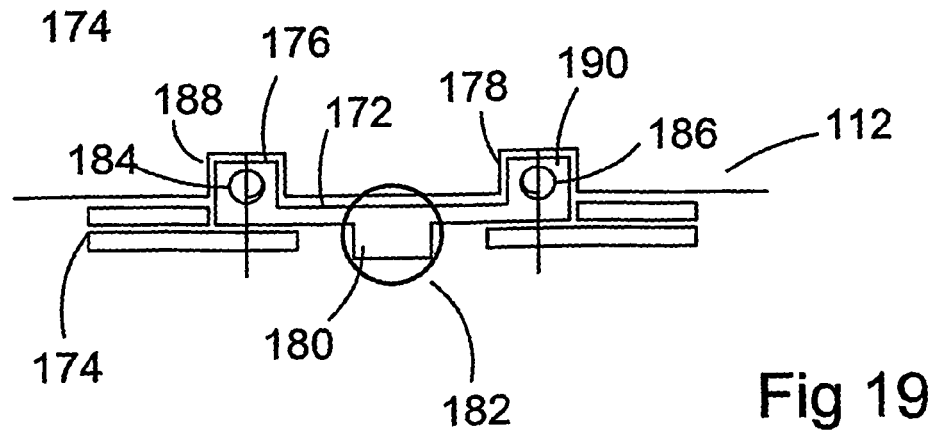
Fig 18
Fig 19

ALIGNING COMPONENTS OF A MEASURING SYSTEM

The present invention relates to a method of and apparatus for aligning the components of an optical measuring system preparatory to using them in a measuring operation.

One known type of optical measuring system consists of two or more housings, at least one of which is to be fixed to the bed of the machine and another one of which is to be carried by the arm or spindle of the machine. Either one or both of the machine bed and machine spindle is movable. One of the housings contains one or more light sources and detectors, and will be referred to hereinafter as the "source housing" while the other housing contains reflectors, and will be referred to hereinafter as the "reflector housing". Usually the source housing is maintained in a fixed position on the bed of the machine and the reflector housing is mounted on a part of the machine moveable with respect to the machine bed e.g. the machine spindle.

Aligning the optical components is often a time-consuming process which involves firstly the alignment of the source housing so that the beam or beams generated are directed along, or parallel to, one or more of the X, Y and Z axes of the machine. Then the reflectors have to be aligned with the beam or beams so that the reflected beams are directed back onto the detectors. Depending on the type of detectors being used the alignment may have to be accurate to within a few arc seconds.

A first aspect of the invention provides a measuring system for calibrating a machine, the measuring system comprising:
   a base attachable to a surface of the machine:
   a housing mountable on the base;
   wherein at least one surface of the base and at least one surface of the housing are each provided with a complementary part of a mounting device, such that when the two parts of the mounting device are connected together, the housing may be aligned in any of a plurality of predetermined directions.

Preferably the measuring system has at least two housings, comprising:
   a base attachable to a first surface of the machine on which a first housing may be mounted;
   a second housing attachable to a second surface on the machine, said first and second surfaces of the machine being moveable relative to one another;
   said first and second housings each being provided with a complementary part of a first mounting device, such that when the two parts of the first mounting device are connected together, the housings are mutually aligned;
   wherein at least one surface of the base and at least one surface of the first housing are each provided with a complementary part of a second mounting device, such that when the two parts of the second mounting device are connected together, the first and second housings may be aligned in any of a plurality of predetermined directions.

The complementary parts of the second mounting device may comprise a set of cooperating elements on the base and the first housing. A subset of cooperating elements used to align the first housing in a first direction may also form a subset of cooperating elements used to align the first housing in a second direction.

Preferably the second housing is mounted onto the second surface of the machine via a connecting device and wherein a plurality of surfaces on the second housing and at least one surface on the connecting device are each provided with a complementary part of a third mounting device, such that the second-housing may be attached to the connecting device when orientated in any of the plurality of predetermined directions.

The complementary parts of the third mounting device may be arranged such that once the first and second housings have been aligned using the first mounting device, and the first housing and base have been aligned using the second mounting device, the second housing and the connecting device may be connected without realignment of the first and second housing relative to one another being required.

Preferably the geometric combination of the first and second housings and the connecting device is such that the axes along which the first and second housings may be aligned intercept at a common point. This may be such that the housing mounted on the moving part of the machine starts in the same position in X, Y and Z whatever the orientation of the first and second housings. Alternatively it may be such that the housing mounted on the moving part of the machine is moved through the common point of interception, whatever the orientation of the first and second housings.

A cable leads to the first housing and the cable may be provided with a cable mounting device, and the at least one surface on the cable mounting device and a plurality of surfaces on the base are each provided with complementary parts of a fourth mounting device such that the cable mounting device may be mounted on the base at different locations such that at each orientation of the first housing, the cable transmits an equal force on the housing. The cable mounting device may be provided with a plurality of angled faces, wherein two or more faces of the cable mounting device are provided with said complementary part of the fourth mounting device, such that different faces of the cable mounting device may be attached to base for different orientations of the first housing, such that the cable transmits an equal force on the housing for each orientation of the housing.

A second aspect of the invention provides a platform for supporting a housing, the housing and platform being provided with complementary parts of a mounting device which define the position of the housing when mounted on the platform, comprising:
   a fixed surface of the platform on which the housing may be supported and on which part of said mounting device is located;
   a lifting mechanism moveable between upper and lower positions relative to said fixed surface;
   whereby in its lower position, the lifting mechanism allows the complementary parts of the mounting device of the housing and the fixed surface to be in contact with one another and in its upper position, the lifting mechanism causes the complementary parts of the mounting device of the housing and the fixed surface to at least partly break contact with one another.

Preferably the lifting mechanism comprises a movable surface of the platform which may be raised and lowered;
   whereby when the housing is placed on the moveable surface of the platform, the moveable surface may be lowered to place the housing onto the fixed surface such that the complementary parts of the mounting device are connected or raised to disconnect the complementary parts of the mounting device.

The movable surface and the housing may be provided with complementary parts of a second mounting device such that the complementary parts of the first mounting device on the housing and fixed surface are thereby pre-aligned.

In a first embodiment, rotation of the movable surface in a first direction causes said movable surface to be raised and wherein rotation of the movable surface in a second opposite direction causes said movable surface to be lowered.

In a second embodiment the movable surface is mounted on a spring whereby rotation of a cam raises or lowers the spring and thus the movable surface.

A third aspect of the invention provides apparatus for adjusting the angle of an object about an axis mounted on a surface comprising:

- an upper plate onto which the object is mounted and a lower plate which in turn is mounted onto the surface;
- a track located on the inner surface of one of the upper and lower plates;
- a ball located between the upper and lower plates, the ball being in contact with the at least one track in the upper or lower plates;
- wherein the track is arranged such that when the ball is moved in a first direction, the ball is raised and causes the plates to move apart and wherein when the ball is moved in a second opposite direction, the ball is lowered and causes the plates to move together.

The track may comprise a pair of non-parallel rollers. Alternatively, the track may comprise a pair of parallel rollers which are positioned at an angle from the plane of the upper or lower plate in which they are located, or a pair of rollers and wherein each roller in the pair of rollers is tapered.

Preferably the other of the upper and lower plates is provided with at least one element which is in contact with the ball. The at least one element may comprise a pair of parallel rollers. Alternatively, the at least one element may comprise a plane surface.

Preferably one of the at least one element and the track in the upper plate is part of a mount for the object and the other of the track and the at least one element of the lower plate is part of a mount for the surface, thereby forming a direct path from the object to the surface through the tracks, balls and elements.

In a preferred embodiment, several sets of balls and tracks are provided so that the angle of the upper plate may be adjusted about several axes. In addition, a track and ball may be provided between adjacent substantially vertical surfaces of the upper and lower plates such that the upper plate may be rotated about the axis perpendicular to the plane of the lower plate.

Preferably the apparatus is provided with at least two tracks and balls to adjust the angle of the upper plate relative to the plane of the lower plate and one track and ball to adjust the angle of the upper plate about the axis perpendicular to the plane of the lower plate, wherein the tracks used to adjust the angle of the upper plate relative to the plane of the lower plate are located in the lower plate so that during rotation of the upper plate, the elements in the upper plate may slide or rotate over the balls and thereby allow the upper plate to be rotated independently of the adjustment of the angle of the upper plate relative to the plane of the lower plate.

Two sets of tracks and rollers and a pivot may be provided to allow adjustment of the angle of the upper plate relative to the plane of the lower plate. In addition, a third set of track and roller may be provided to provide rotation of the upper plate about an axis perpendicular to the plane of the lower plate.

Three sets of tracks and rollers may be provided to allow adjustment of the angle of the upper plate relative to the plane of the lower plate and in addition allow adjustment of the height of the upper plate relative to the lower plate. A fourth set of tracks and rollers may be provided to provide rotation of the upper plate about an axis perpendicular to the plane of the lower plate.

The invention will now be described, by way of example only, and with reference to the following drawings in which:

FIG. 1 is a diagrammatic elevation of the component of a prior art optical measuring system;

FIGS. 3A–3E are views of the source and reflector housings aligned along the X, Y, -X, -Y and Z axis directions;

FIG. 18 is a plan view of a biasing spring used in the base plate of FIGS. 7–9;

FIG. 19 is a side view of the biasing spring of FIG. 18;

Figure 2:
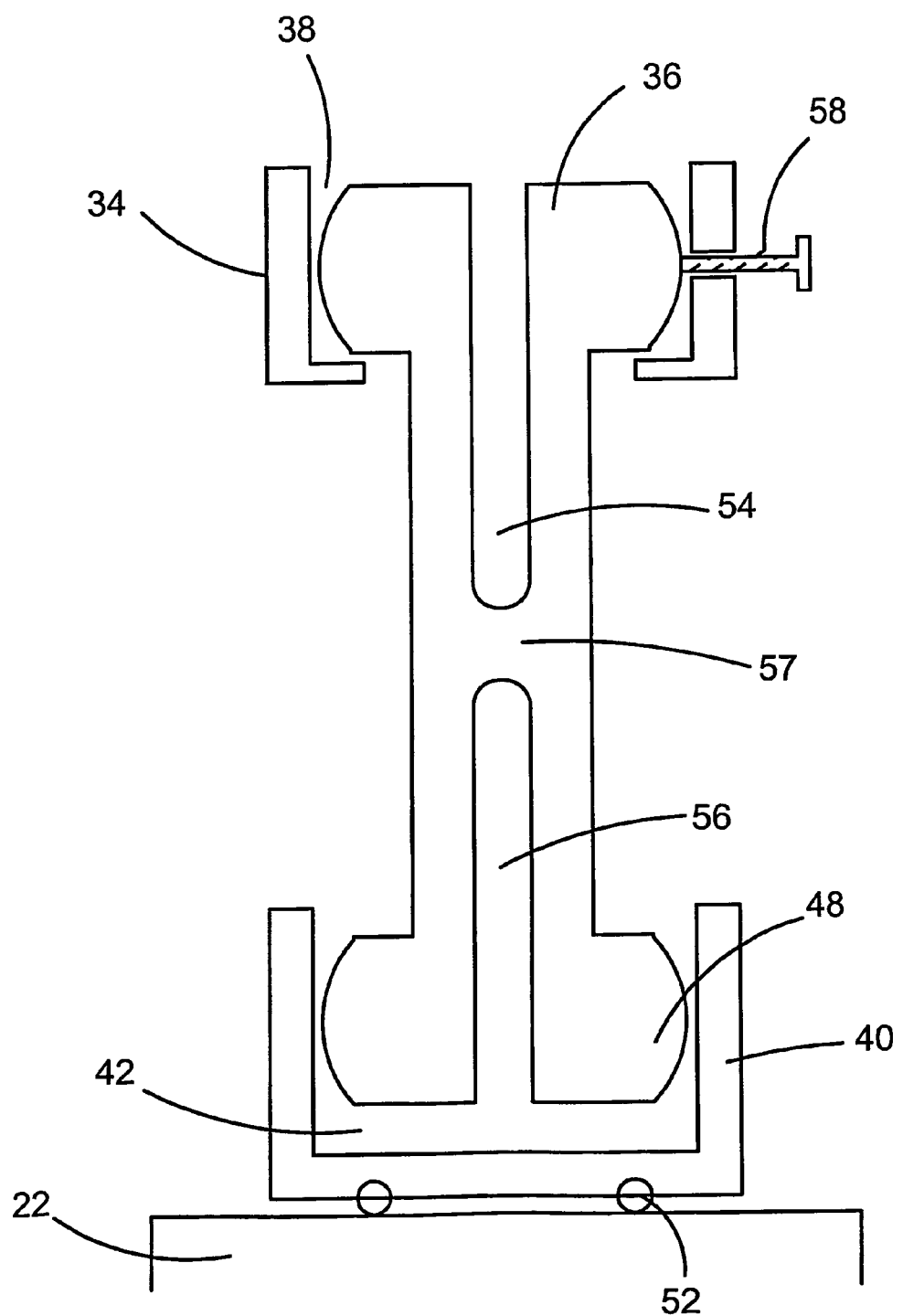
FIG. 2 is a side view of an adjustable connector according to the invention.

Referring to the drawings, FIG. 1 shows a prior art embodiment of an optical measuring system for mounting on a machine as disclosed in co-pending application PCT/GB01/03096 filed on 11$^{th}$ Jul. 2001.

The optical measuring system includes a base plate 10, a source housing 20 and a reflector housing 22, all of which need to be properly aligned with one or more of the machine axes. The base plate 10 is connected to the bed of the machine by screws 12, 14.

The source housing 20 may contain an autocollimator formed in optical sequence by, a light source 24, a beam splitter 26, a collimating lens 28 through which a collimated light beam passes out of the housing, and a detector 30 which receives a return light beam from the reflector 32 in the reflector housing 22 via the beam splitter 26.

The source housing 20 also includes a kinematic seat in the form of three cooperating pairs of male and female elements, for example a ball and V-groove 16, suitably spaced and arranged in a triangular array, for example spaced at 120° apart. The seating elements 16 co-operate with three V—shaped grooves (not shown) on the base plate to form a conventional kinematic seat for repeatable positioning of the housing on the base plate.

The source housing has a further kinematic seat 18 on its front face (i.e. the face which is orthogonal to the beam direction) on which the reflector housing may be seated. The light source and the reflector are aligned during the manufacturing stage to ensure that when the reflector housing is seated in the kinematic seat 18 on the front fact of the housing, the light beam and reflector are properly aligned.

It can be seen therefore that once the source housing 20 is correctly aligned to direct a light beam along one of the machine axes, eg the X-axis, the reflector housing 22 can be seated on the kinematic seat 18 on the front face of the source housing 20, and will automatically be aligned with the beam from the light source 24. Magnets 33 may be used to urge the two housings 20,22 together at the kinematic seat 18.

In order to take care of any mis-match in position between the machine spindle 34 and the reflector housing 22 when the two are to be connected together, the reflector housing 22 is provided with a limited amount of compliance by using an adjustable connector by means of which the housing 22 can be connected to the spindle 34 of the machine. The adjustable connector has a ball 36 which is to be seated in a socket 38 on the machine spindle. The ball 36 is adjustably supported in a retaining device 40 which, in turn is connected to the reflector housing 22, by any suitable means.

A preferred embodiment of the adjustable connector will now be described with reference to FIG. 2. The socket 38 of the machine spindle comprises a cylindrical bore which houses ball 36 of the adjustable connector. The retaining device 40 also comprises a cylindrical bore 42 and is mounted on the reflector housing 22, preferably by kinematic mounts 52.

The ball 36 of the adjustable connector is connected by a stem 46 to a further ball 48 which lies inside the bore 42 of the retaining device 40.

The Balls 36 and 48 of the adjustable connector may only have a part spherical surface at the portion of the ball in contact with the surface of the cylindrical bore.

The ball 36 can be adjusted through a limited angle to enable it to be engaged in the socket 38 of the machine spindle. The ball is retained in socket 38 in known manner by providing magnets (not shown) in the ball 36, the socket 38, or both.

Two slits 54,56 extends from opposite ends of the adjustable connector along its longitudinal axis to just short of its centre, leaving just a small bridging portion 57 connecting the two halves of the adjustable connector together. A locking screw 58 is provided in the socket 38 of the machine spindle which when tightened pushes against the ball 36, thus fixing the ball 36 within the socket 38 and also pushing the two halves of the ball 36 together. The bridging portion 57 of the adjustable connector acts as a hinge and as the two halves of ball 36 are pushed together, the two halves of ball 48 are pushed apart and against the sides of the cylindrical bore 42, fixing it in position.

This connector thus has the advantage that one actuation locks both balls.

Once the source housing 20 has been aligned with an axis of the machine, the reflector housing 22 attached to the machine spindle can be brought up to the source housing 20. With the locking screw loosened, the adjustable connector will be free enough to rotate so that the reflector housing 22 will seat in the kinematic seat 18. By this means automatic alignment of the source housing 20 and the reflector housing 22 can be ensured. Once seated in the kinematic seat 18 the locking screw is tightened to maintain the orientation of the housing 22.

It is desirable to align the source housing 20 with other machine axes. In the above-described example, where the source housing is mounted on a base plate, the source housing may have other sets of kinematic elements on its lower surface or on other ones of its orthogonal faces. By this means it can be rotated through 90° in different planes and be re-seated on the kinematic seat on the base plate in different orientations with the light beam from the source directed along different ones of the machine axes. The reflector housing will continue to seat in the same kinematic seat 18 on the source housing so that it will also be aligned with the different axes.

Figure 3E:
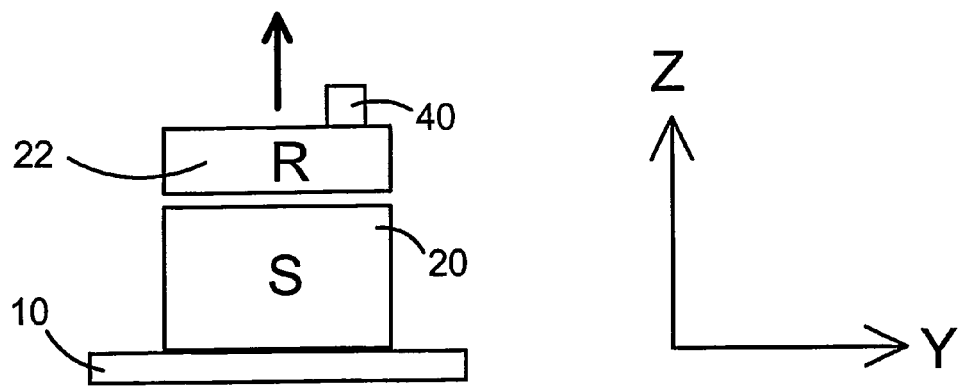

FIGS. 3A–D show the plan view of the source housing 20 and reflector housing 22 on the base plate 10. FIG. 3a shows the light beam aligned with the X axis, FIG. 3b shows the light beam aligned with the Y axis, FIG. 3c shows the light beam aligned with the −X axis and FIG. 3d shows the light beam aligned with the −Y axis. FIG. 3e shows a side view with the light beam aligned with the Z axis.

A set of kinematics elements are provided on the base plate and source housing to define each of the X, Y, Z, −X, −Y directions. Each set of kinematics are not necessarily independent, with balls and rollers or V-shaped grooves from one set also forming part of another set.

Alternatively a block in the form of a cube or a cuboid may be used instead of a base plate. Such a block would be provided with kinematic seats on various ones of its orthogonal faces so that, by using a single kinematic seat on the source housing, it can be oriented in different directions by engaging its kinematic seat with any one of those on the block. Also in this case the reflector housing will continue to use the same kinematic seat on the source housing.

For each orientation of the source and reflector housing 20,22, the reflector housing 22 must be mounted on the retaining device 40 of the adjustable connector in a different position. The location of the reflector housing 22 on the retaining device 40 for each orientation is defined by a respective kinematic seat. A different set of kinematic elements is thus provided between the reflector housing 22 and the retaining device 40 for each orientation of the reflector housing. As before, each set of kinematics may share elements with another set. This enables the orientation of the reflector housing 22 to be changed without adjustment of the adjustable connector in the machine spindle.

Once the source and reflector housings 20,22 have been aligned for the first axis using the kinematic seat 18, the orientations of the kinematic elements between the source housing 20 and the base plate 10 and between the reflector housing 22 and the retaining device 40 means that for subsequent axes, realignment of the source and reflector housings 20,22 on the kinematic seat 18 is not required.

For calibration of large machines, it is desirable to start with the source housing 20 in the middle of the machine and first move the reflector housing 22 along one axis (e.g. X axis) and then turn the source and reflector housings 20, 22 around 180° and move the reflector housing along that axis in the opposite direction (e.g. −X axis). It is thus desirable for the source housing 20 and base plate 10 to have kinematics defining the −X and −Y directions.

There are thus five sets of kinematics between the source housing 20 and the base plate 10 and between the reflector housing 22 and the retaining device 40 defining the X,Y, Z,−X and −Y directions, although each set is not necessarily independent from the other sets.

Figure 4A:
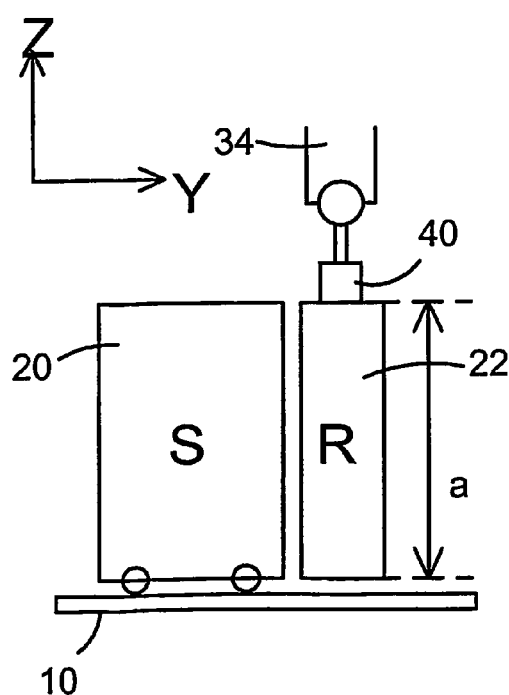
FIGS. 4A and 4B show the geometric combination of the source and reflector housings aligned along the Y and Z directions.
Figure 4B:
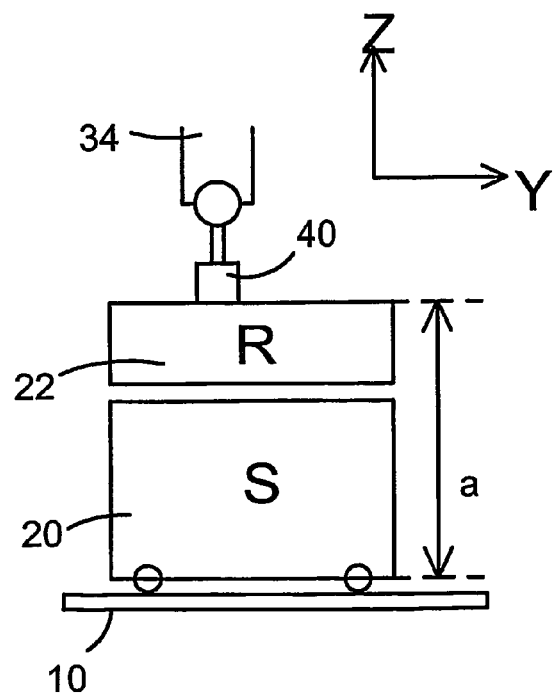

As illustrated in FIGS. 4A and 4B, the geometric combination of the source housing 20 and the reflector housing 22 allow the same co-ordinate start position for calibration of x,y and z axis after initial set up.

FIG. 4A shows the source housing 20 being aligned along the Y axis and FIG. 4B shows the source housing 20 aligned along the Z axis. In both cases the distance a between the quill 34 and the reflector housing 22 is the same. Thus when calibrating in different orientations (i.e. along the X,Y or Z axes), the start point is always the same.

Figure 4C:
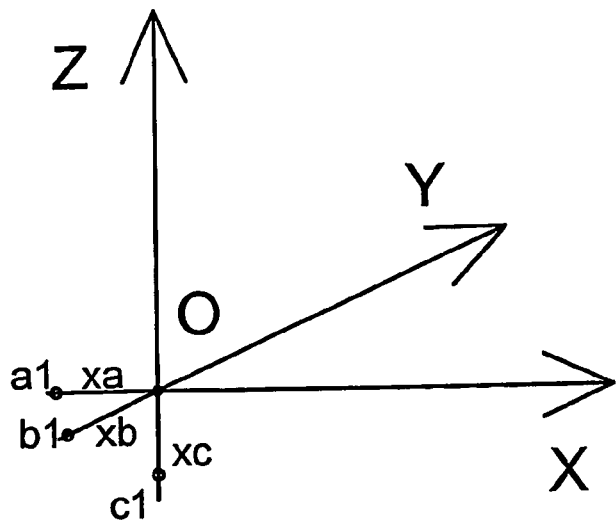
FIGS. 4C and 4D illustrate the interception of axes for different orientations of the housings.
Figure 4D:
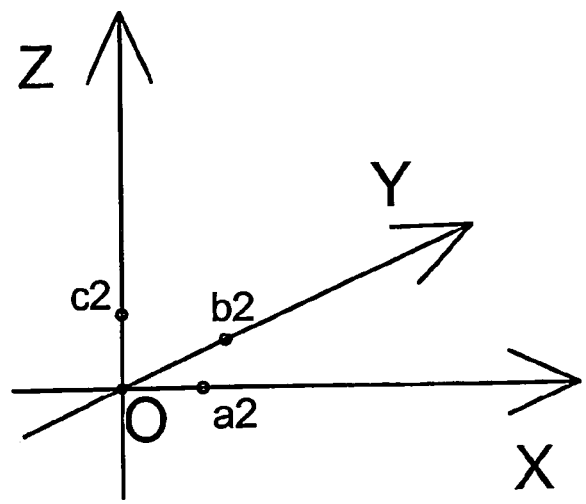
Figure 4E:
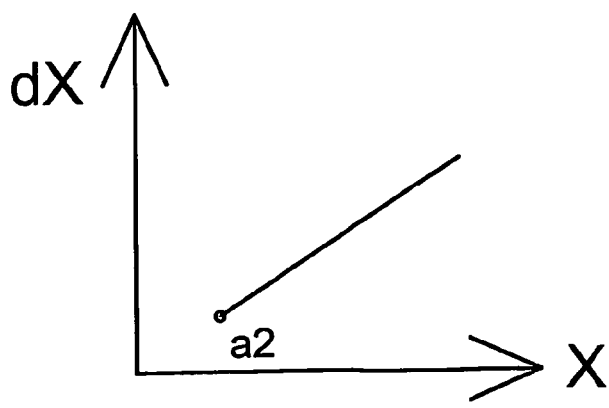
FIG. 4E illustrates the errors along the X direction for FIG. 4D.

As illustrated in FIG. 4C, the geometric combination of the source housing 20 and the reflector housing 22 is such that there is an interception of the axes (X,Y,Z) along which the source and reflector housings are to be aligned. Preferably the co-ordinate start position is at this interception O (as described above). However it is also possible to have non-common start positions, a1,b1,c1 for each orientation, as long as there is an interception of the axes and the distance xa,xb,xc between each start point a1,b1,c1 and the interception O is known. (Although these distances do not need to be known accurately). In this case, it is preferable that the start points are on the far side of the interception from the direction of travel, as illustrated in FIG. 4C, as this results in no loss of information during movement of the reflector housing. As illustrated in FIG. 4D, this would not be the case if the start positions a2,b2,c2 are on the other side of the interception O as there will be no data between the interception and the start positions a2,b2,c2 which will introduce errors. FIG. 4E shows the measurement data along the X axis for the arrangement of FIG. 4D. There is no information between the origin O and the start point a2.

The optical source may be located remotely from the source housing, particularly as heat from the optical source may cause distortion on the housing. An optical fibre may thus be used to channel the light from the light source to the source housing.

Figure 5A:
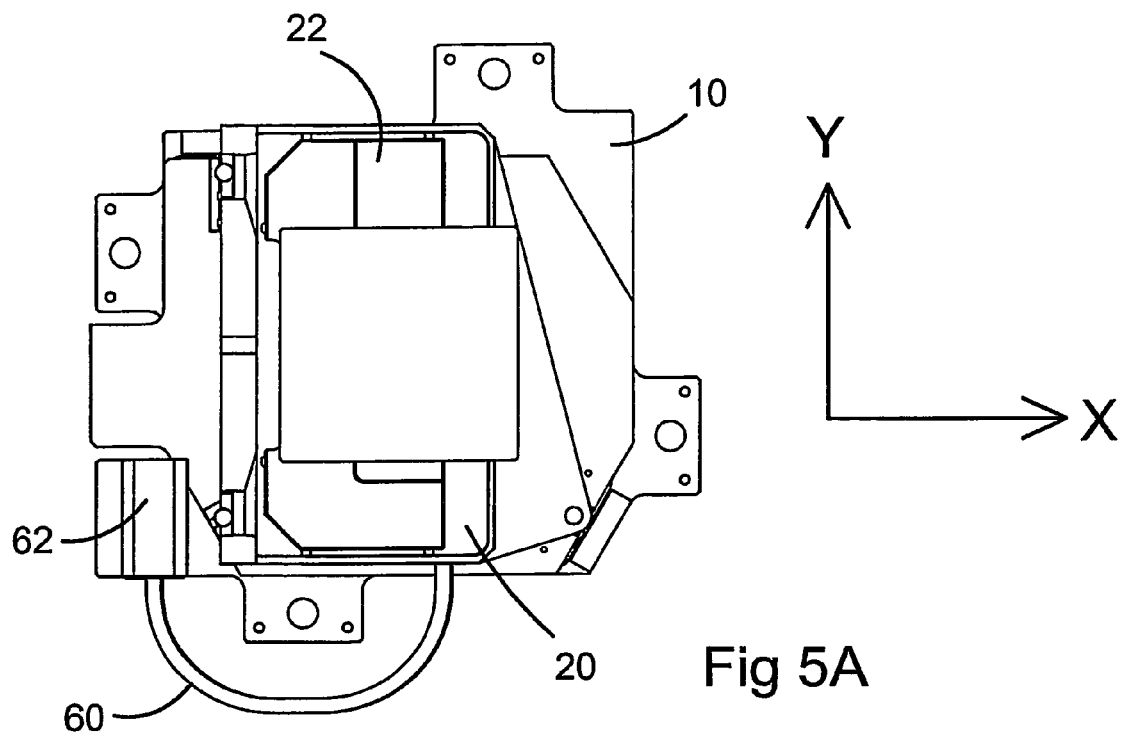
FIG. 5A is a plan view of the optical measuring system aligned with the Z axis.
Figure 5B:
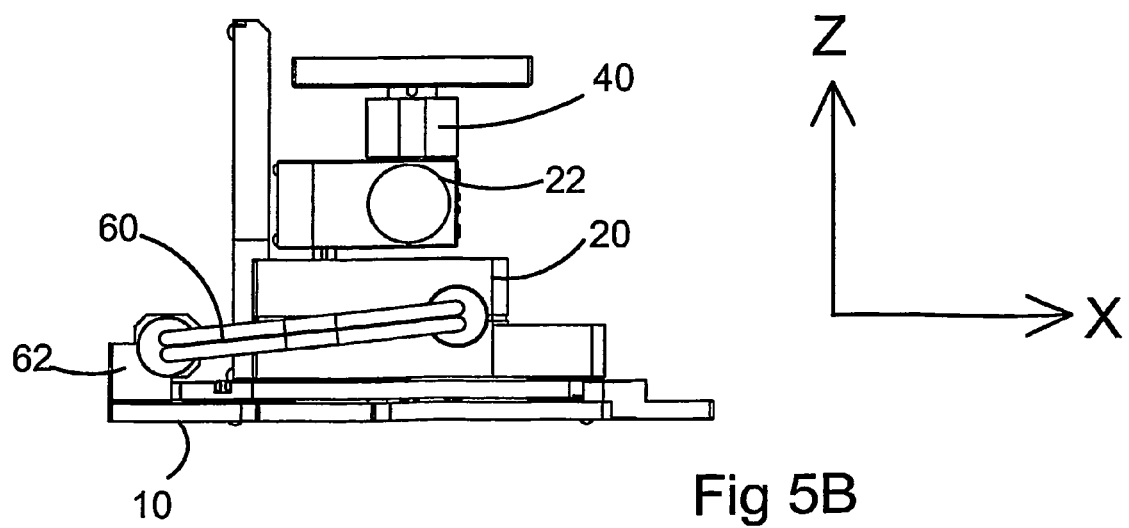
FIG. 5B is a side view of the optical measuring system aligned with the Z axis.
Figure 5C:
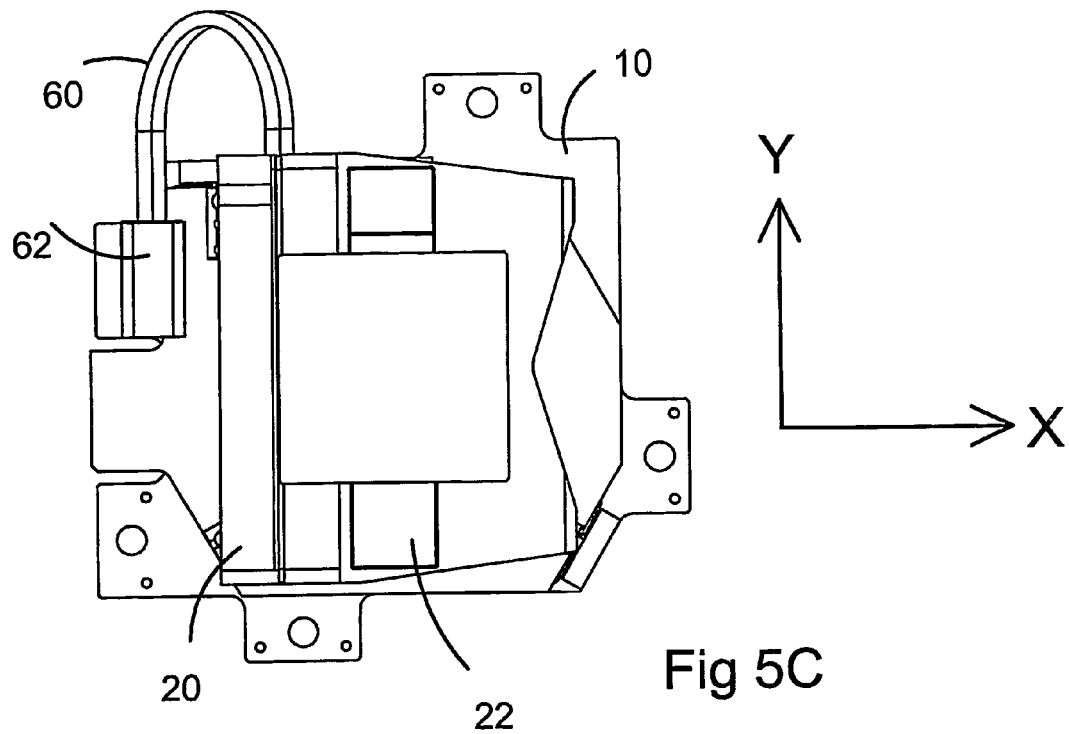
FIG. 5C is a plan view of the optical measuring system aligned with the X axis.
Figure 5D:
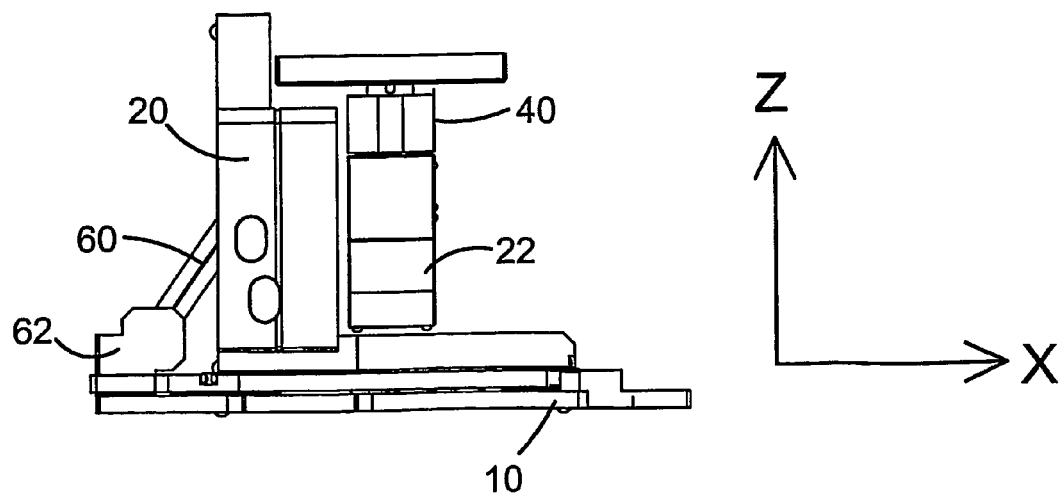
FIG. 5D is a side view of the optical measuring system aligned with the X axis.

The source housing is provided with a supply cable which houses the optical fibres, electrical signals and supplies. This is shown in FIGS. 5A–D. FIGS. 5A and 5B show the plan and side view respectively of the source housing 20 aligned with the Z axis. FIGS. 5C and 5D show the plan and side view respectively of the source housing aligned with the X axis. The supply cable 60 transmits forces due to its bending onto the source housing 20 which may result in the source housing not sitting squarely on the kinematic seat 16. It is therefore desirable to minimise the force due to the bending of the cable 60.

The supply cable 60 is provided with a cable mounting block 62 which may be attached to the base plate 10. The mounting block can be clipped into various locations on the base plate 10 depending upon the orientation of the source housing 20. The position of the cable mounting block 62 on the base plate 10 is defined by a location seat which could be kinematic and is held in position by magnets (not shown).

The cable mounting block 62 has a plurality of angled faces, such that in different orientations of the source housing 20, different faces of the cable mounting block may be clipped onto the base plate 10, by way of a respective seat, e.g., kinematic seat on that face.

The position of the location seats and the angles of the faces of the cable mounting block 62 ensures that minimal and equal forces from the cable are transmitted to the source housing for each orientation of the source housing.

In the present embodiment the base plate is provided with a controlled lowering platform so that the source block is lowered onto the kinematics in controlled way. Use of a controlled lowering platform has the advantage that the source housing is gently lowered onto the kinematics ensuring an accurate repeatable location. It also minimises damage to the kinematic elements.

Figure 6A:
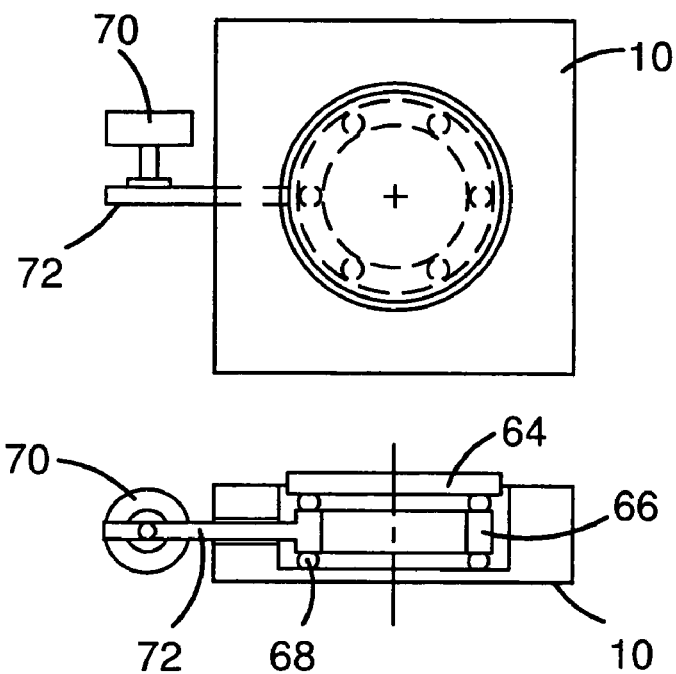
FIGS. 6A and 6B show plan and side views of a first embodiment of the controlled lowering platform.

FIG. 6A shows a first embodiment of the controlled lowering platform. A lifting platform 64 is provided onto which the source housing 20 may be placed. This is separated from the base plate by a rotatable disc 66. Ball bearings 68 are located between the disc 66 and the base plate 10 and between the disc 66 and the lifting platform 64 to allow rotation of the disc 66. The surface of the disc 66 is provided with tapered grooves into which the ball bearings 68 are seated. When the ball bearings are seated in the wide portion of the groove, the lifting platform 64 is in its lowered position. However as the disc 66 is rotated, the groove presents its narrower portion to the ball bearing 68 resulting in the lifting platform 64 being raised. By moving the disc 66 in the opposite direction, the lifting platform 64 may gently be lowered.

Figure 6B:
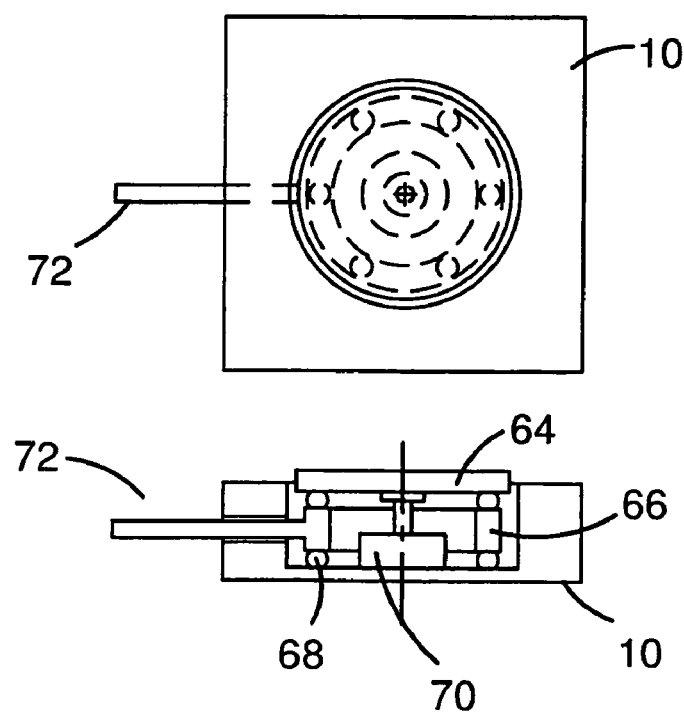

A damper 70 is provided to smooth the movement of the lifting platform 64. The damper 70 may be provided on a lever 72 which is used to rotate the disc 66. Alternatively the damper 70 may be located between the base plate 10 and the lifting platform 64, as shown in FIG. 6B.

Figure 6C:
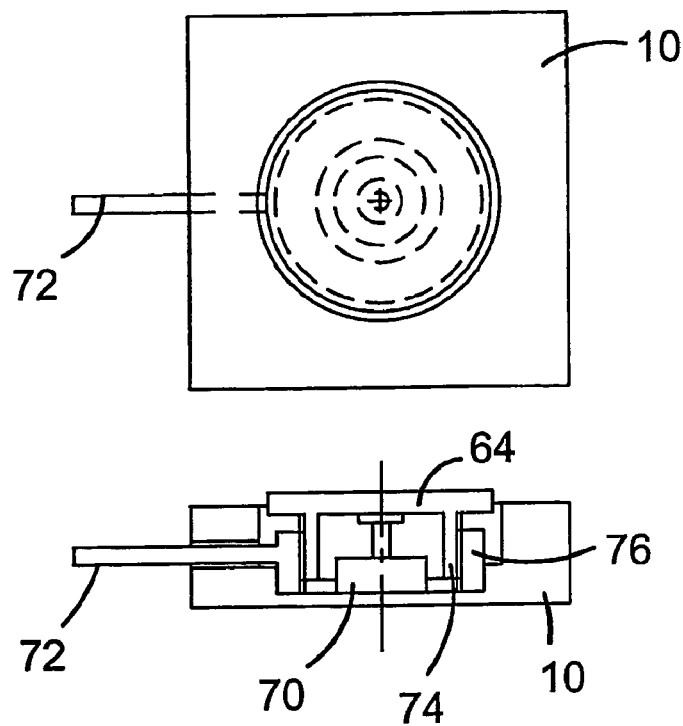
FIGS. 6C and 6D show plan and side views of a second embodiment of the controlled lowering platform.
Figure 6D:
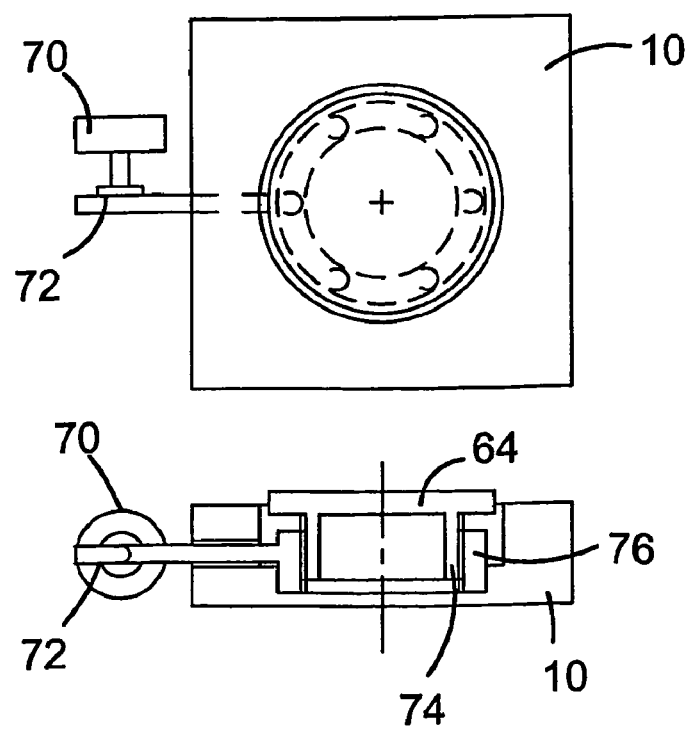

A second embodiment of the controlled lowering platform is illustrated in FIGS. 6C and 6D. In this embodiment, the lifting platform 64 is provided with a downwardly dependent cylinder 74 with a threaded outer surface. The central disc is replaced by a ring 76 with a threaded inner surface. Rotation of the ring 76, using the lever 72 will result in the lifting platform 64 being raised by rotation in one direction and the lifting platform being lowered in the opposite direction.

As in the previous embodiment, a damper 70 may be provided on the lever 72 as shown in FIG. 6D or between the base plate 10 and the lifting platform 64, as shown in FIG. 6C.

Figure 6E:
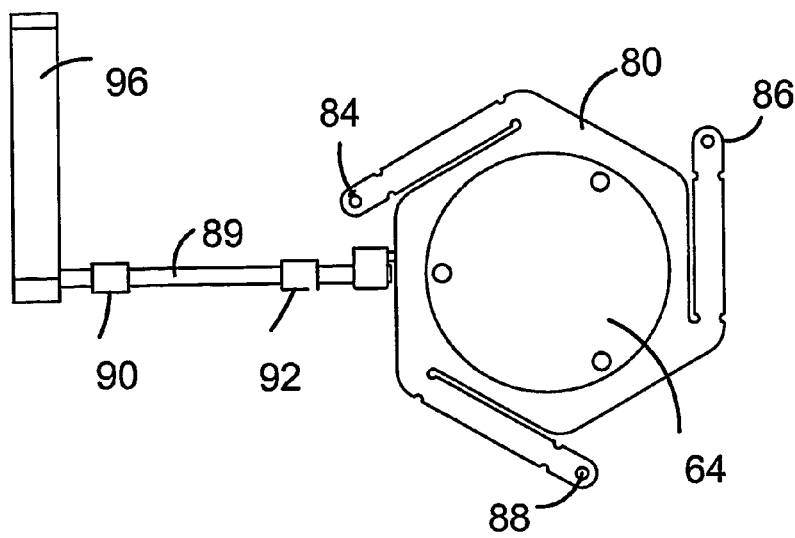
FIGS. 6E–6G show plan, side and perspective views of a third embodiment of the controlled lowering platform.
Figure 6F:
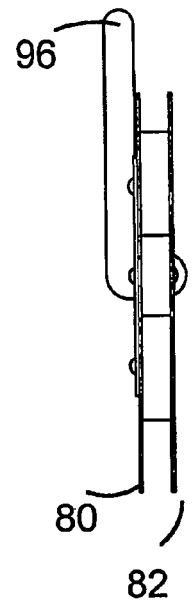
Figure 6G:
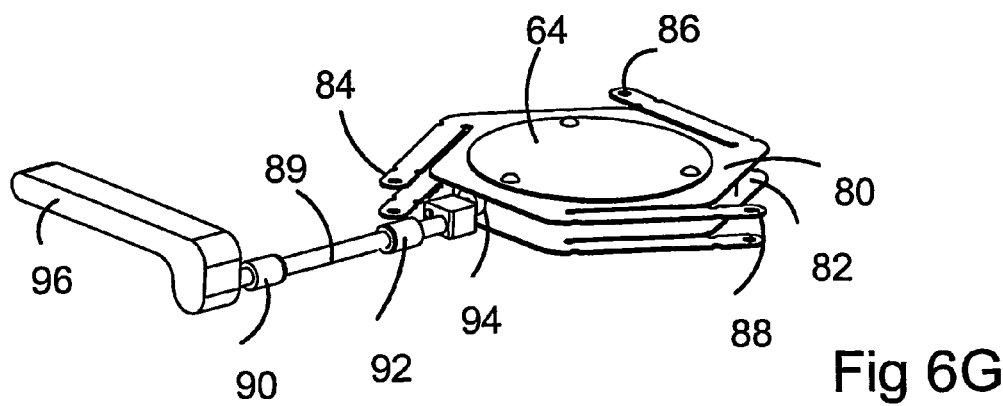

A third embodiment of the controlled lowering platform is illustrated in FIGS. 6E, 6F and 6G. In this embodiment the lifting platform 64 is supported by a pair of parallel springs 80, 82. Both springs 80,82 are connected to a fixed part of the platform (not shown) at points 84, 86, 88 on their outer surfaces and to the moveable platform 64 at their inner surfaces.

A rod 89 is provided with a cam 94 at one end which abuts the upper spring 80 and a lever 96 at its other end. The rod 89 is rotatable about bearings 90, 92 in the fixed surface of the platform (not shown). Rotation of the lever 96 causes rotation of the rod 88 and cam 94. As the cam 94 abuts the upper spring 80, it raises or lowers the inner surface of the upper spring 80 as it rotates and thereby also raises and lowers the lifting platform 64 which is attached to the inner surface of the spring 80.

Use of a pair of parallel springs 80,82 results in parallel movement of the lifting platform 64, so that even though the cam is located on one side of the spring 80, the lifting platform 64 is raised and lowered without tilting.

In all three embodiments, whether the lifting platform has a rotational or linear movement, the mechanisms allow the movement of the lifting platform to be highly repeatable so that each time the source housing is lowered onto the kinematics, it is lowered accurately to the same position.

Figure 6H:
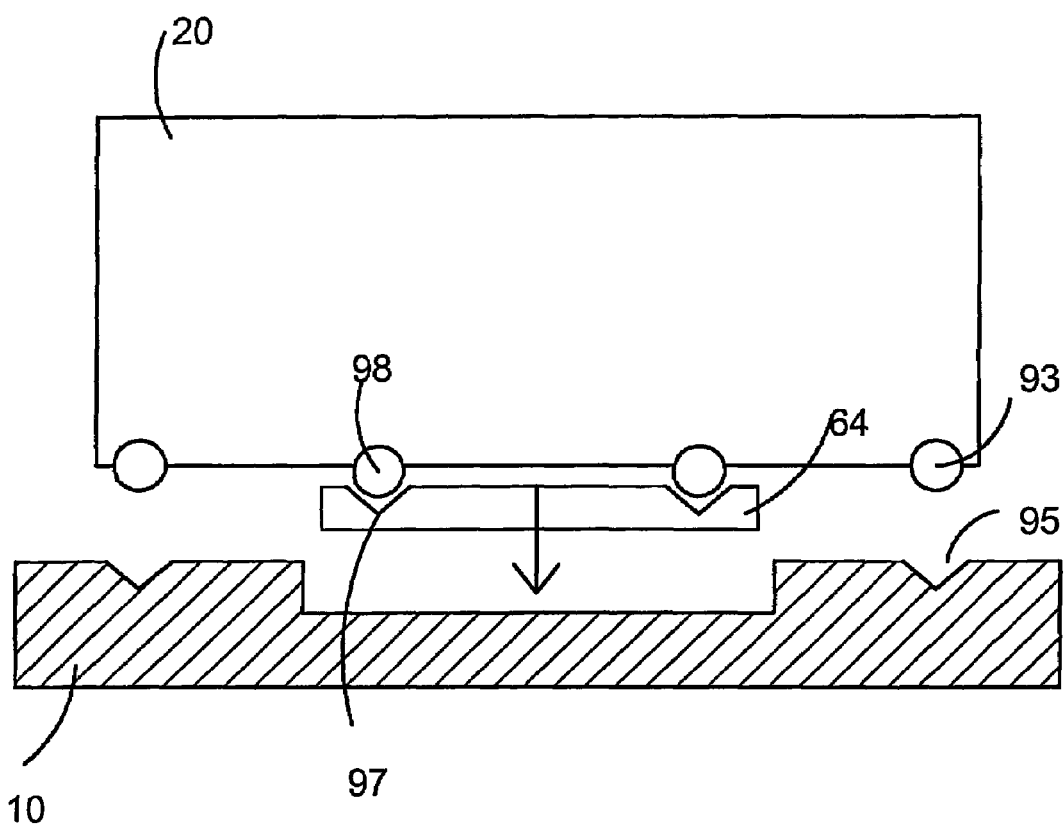
FIG. 6H illustrates a side view of the controlled lowering platform.

The lifting platform of the controlled lowering platform may also be provided with a set of location elements 97, with a corresponding set of location elements 98 on the source housing 20, as illustrated in FIG. 6H. These location elements 97,98 act to correctly position the source housing 20 on the lifting platform 64 so that when the platform 64 is lowered, the kinematic elements 93 on the source housing 20 are pre-aligned with kinematic elements 95 on the base plate 10 and the source housing 20 may therefore be lowered correctly onto the base plate kinematics. These location elements 97,98 on the lifting platform 94 and source housing 20 may be less accurate than the location kinematics 93,95 between the source housing 20 and base plate 10. The location elements 97,98 on the source housing and lifting platform thereby receive most of the wear and thus protect the kinematic elements 93,95 on the source housing 20 and base plate 10.

As described earlier, the source housing is mounted on a base plate which is in turn mounted onto the machine table. The base plate must be aligned with the X-Y plane and this is normally achieved by mounting it on an accurately horizontal machine bed. However if the machine bed is not accurately horizontal, then adjustment of the base plate is required.

FIGS. 7 to 20 illustrate a base plate provided with an adjustment mechanism which allows for tilt adjustment about both X and Y axes and rotation about the Z axis. The adjustable base plate will now be described in more detail with reference to these figures.

Figure 8:
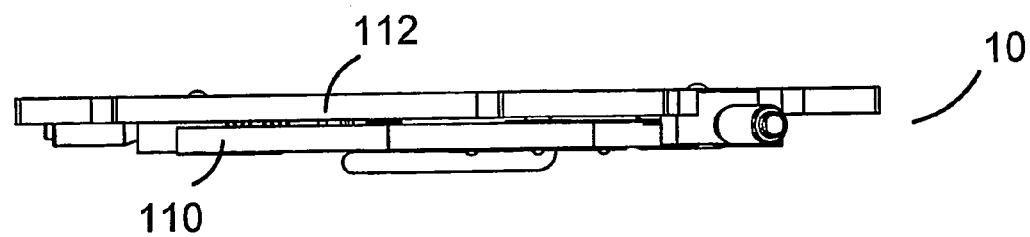
FIGS. 7–9 illustrate plan, side and perspective views of the base plate.
Figure 7:
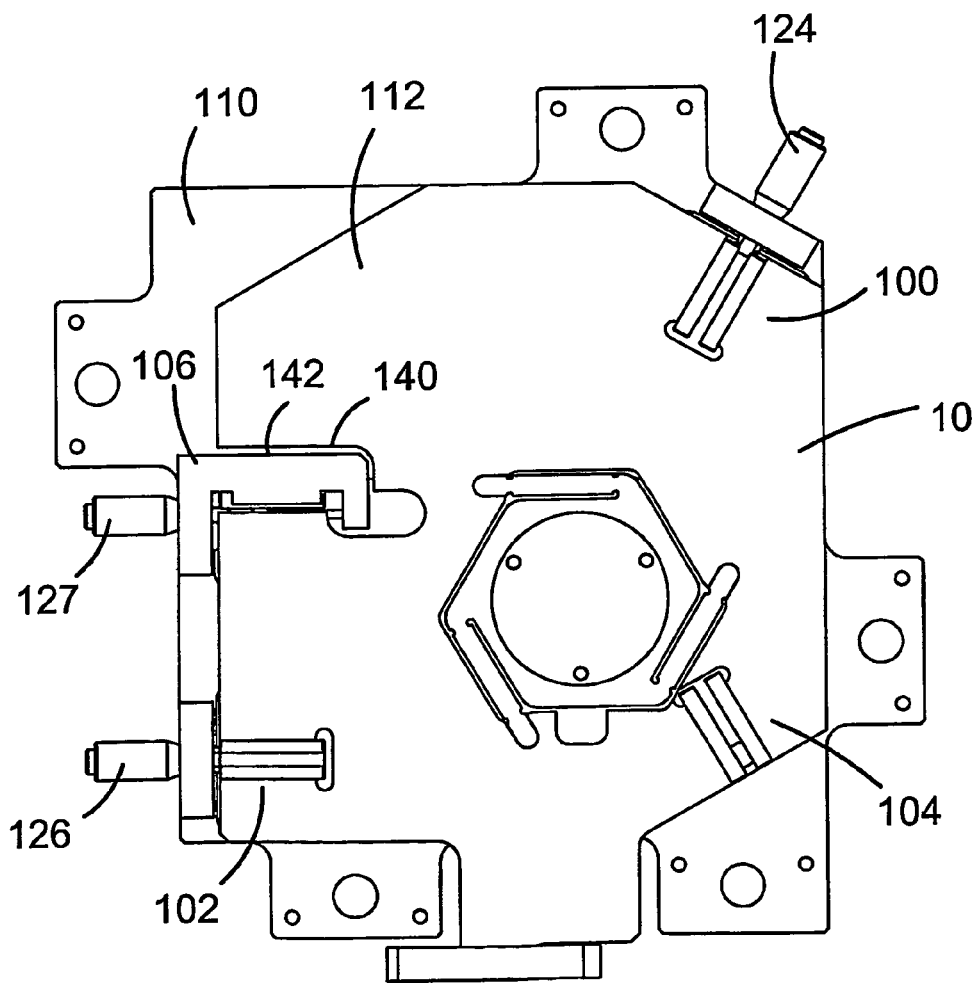
Figure 9:
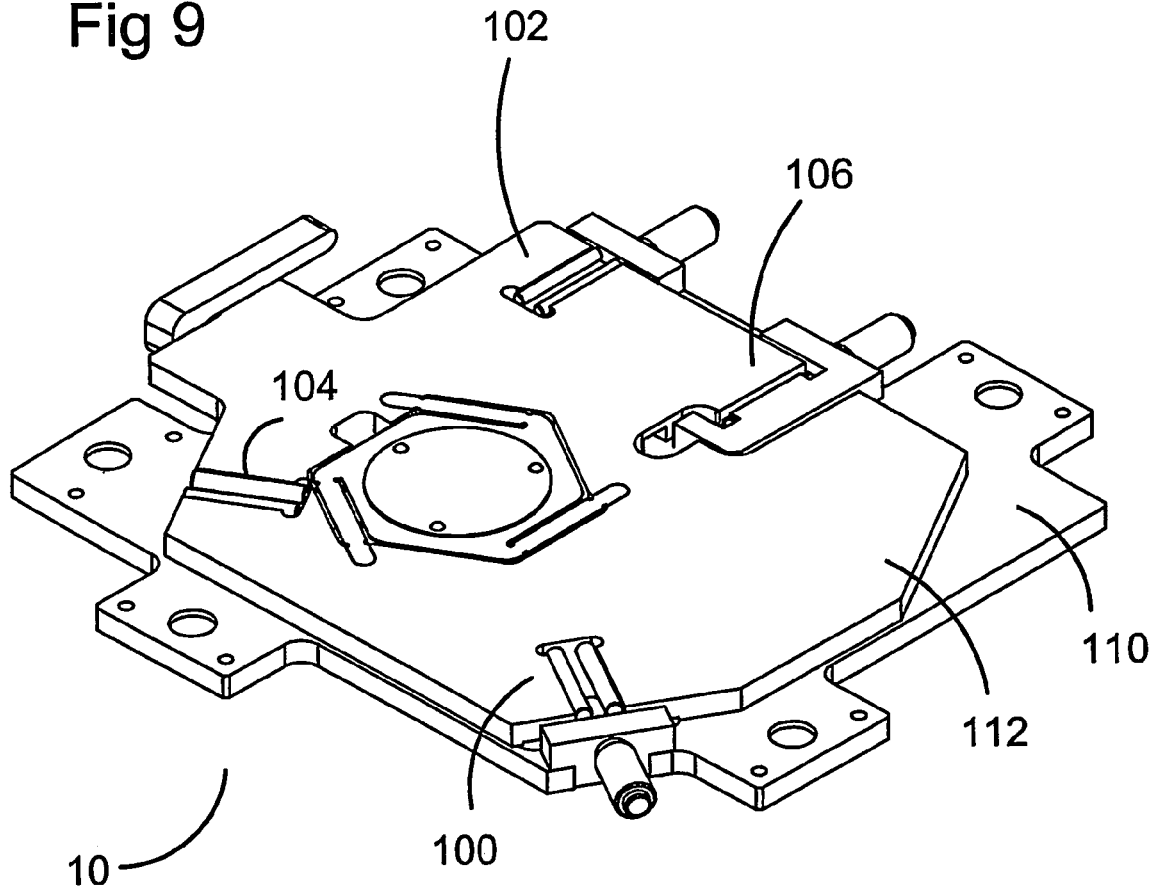

FIGS. 7, 8 and 9 show top, side and isometric views of the base plate 10 respectively. The base plate comprises a lower plate 110 and an upper plate 112 which is moveable relative to the lower plate. The upper and lower plates may be connected by means (not shown) which allow relative movement between them, such as magnetic or spring means.

Figure 10:
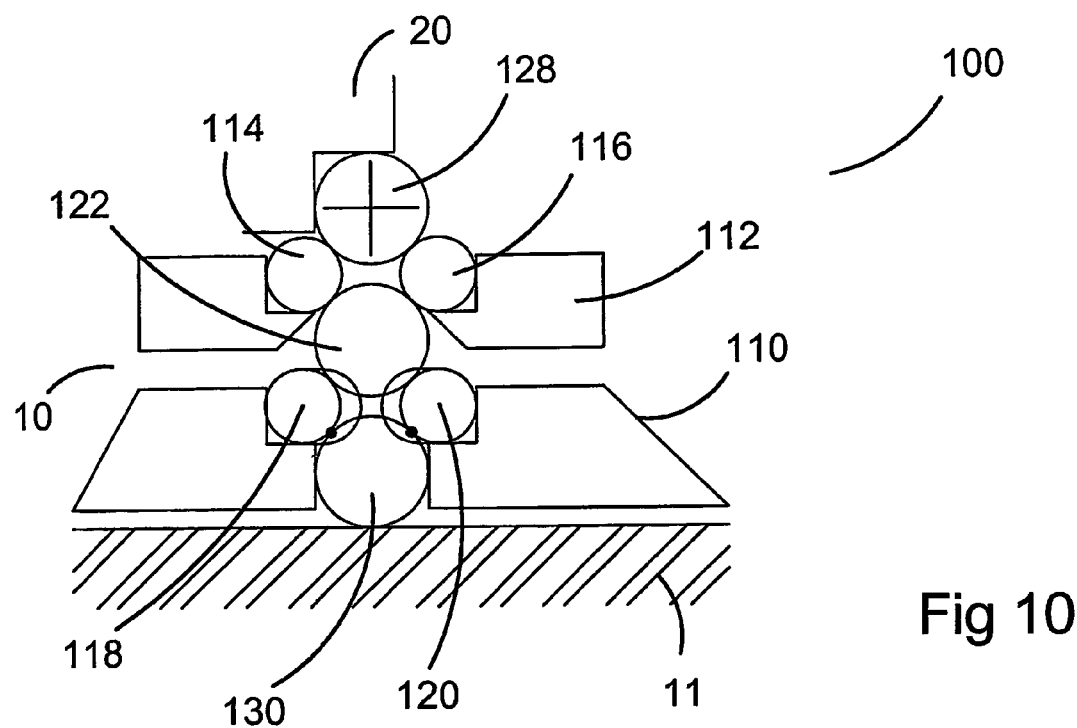
FIG. 10 is a cross section of the first tilt adjustment device.

First and second tilt adjusters 100,102 are provided on the base plate to enable adjustment of the tilt of the upper plate about the X and Y axes respectively. FIG. 10 shows a cross section of the first tilt adjuster 100. A pair of rollers 114, 116 is provided in the upper plate 112 and a pair of rollers 118, 120 is provided in the lower plate 110. A ball 122 is located between the upper and lower plates and is in contact with both pairs of rollers. The pair of rollers 114, 116 located in the upper plate 112 are parallel to one another. However the pair of rollers 118, 120 located in the lower plate 110 are non parallel. If the ball 122 is moved along the rollers 118, 120 towards the narrower end, the ball 122 will be pushed upwards and will in turn push the upper plate 112 upwards. If the ball 122 is moved in the opposite direction towards the wider end, the ball 122 will be lowered and in turn the upper plate 112 will be lowered. As shown in FIGS. 7 and 9, an adjustment screw 124 is provided to alter the position of the ball 122 within the first adjustment device 100.

As shown in FIG. 10, the pair of rollers 114, 116 in the upper plate 112 provide a kinematic seating for a kinematic element 128 of the source housing 20 and an element 130 is located in contact with and in a fixed position relative to the pair of rollers 118, 120 in the lower plate 110 to connect with the machine table 11.

Figure 11:
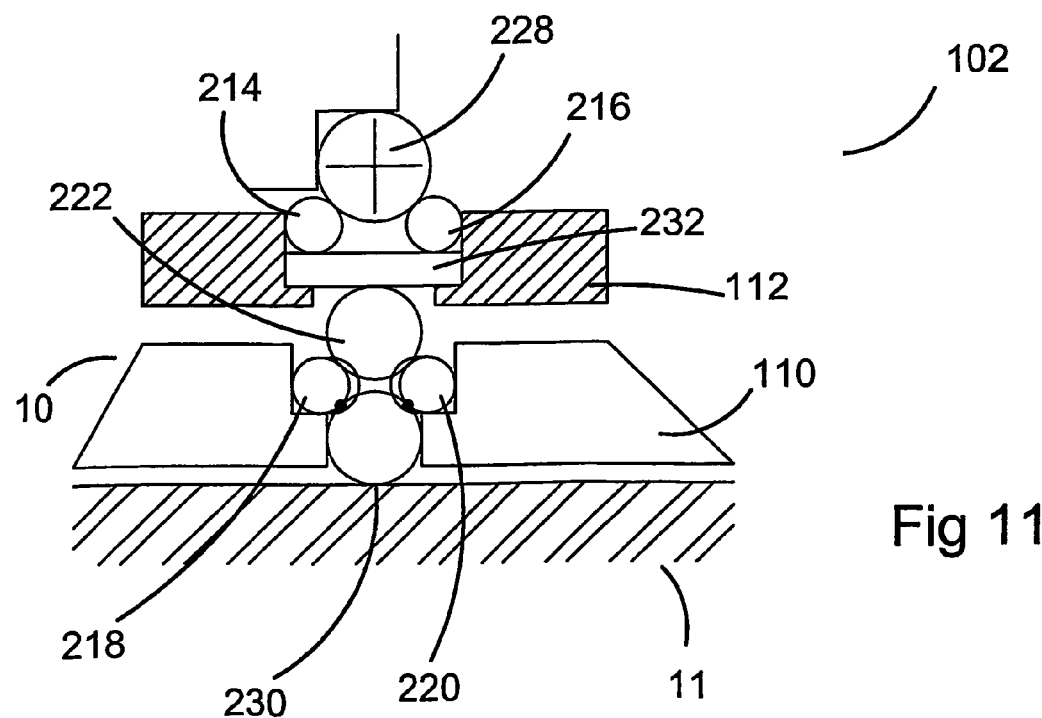
FIG. 11 is a cross section of the second tilt adjustment device.

FIG. 11 shows a cross section of the second tilt adjuster 102. As before, each of the upper and lower plates 112, 110 is provided with a pair of rollers 214, 216 and 218,220 respectively, which locates kinematic elements 228 and 230 in contact with the source housing 20 and machine table 11 respectively. As before, element 230 is in contact with and in a fixed position relative to rollers 218, 220. However, the second tilt adjuster 102 differs from the first 100 in that a plate 232 is provided beneath the pair of parallel rollers 214, 216 in the upper plate 112. The ball 222 between the upper and lower plates 112, 110 is thus in contact with the pair of rollers 218, 220 beneath it and the plate 232 above it. As before, adjustment of the position of ball 222 using the adjustment screw 126 raises or lowers the upper plate 112 directly above it.

Figure 12:
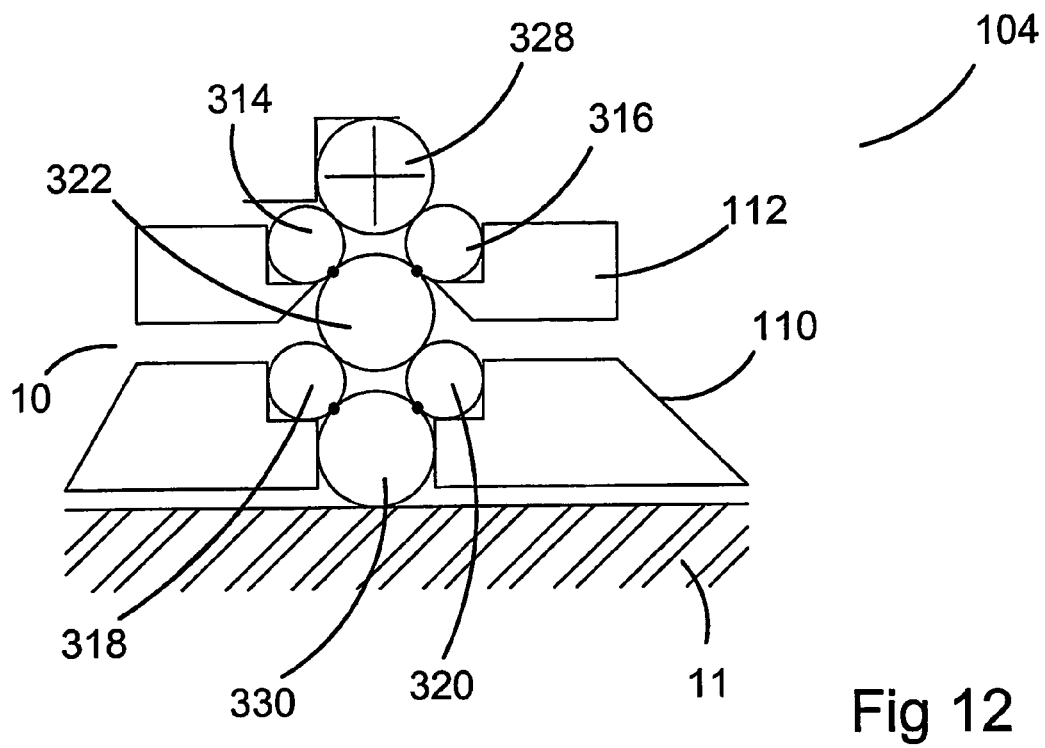
FIG. 12 is a cross section of the third location.

At a third location 104, another ball 322 is provided between the upper and lower plates 112, 110 sandwiched between upper and lower pairs of rollers. FIG. 12 shows a cross section of this arrangement. As before both of the upper and lower plates 110, 112 are provided with a pair of rollers, 314, 316 and 318, 320 respectively, and the ball 322 is in contact with both pairs of rollers. Ball 322 is in a fixed position with respect to rollers 314, 316 and ball 220 is in a fixed position with respect to rollers 318, 320. In this case both pairs of rollers are parallel and the ball 322 is not provided with an adjustment screw.

To adjust the tilt of the base plate 10 about the X axis, the adjustment screw 124 of the first tilt adjuster 100 is turned. This will either push the ball 122 and thus the upper plate 112 upwards or downwards, depending on the direction it is turned. As the adjustment screw 124 of the first tilt adjuster 100 is turned, the upper plate 112 will pivot about the ball 222 of the second tilt adjuster 102 and the ball 322 in the third location 104.

To adjust the tilt of the base plate 10 about the Y axis, the adjustment screw 126 of the second tilt adjuster 102 is turned. As described above, this will either push the ball 222 and thus the upper plate 110 upwards or downwards. As the adjustment screw 126 of the second tilt adjuster 102 is turned, the upper plate 110 will pivot about the ball 122 of the first tilt adjuster 100 and the ball 322 in the third location 104.

Figure 13:
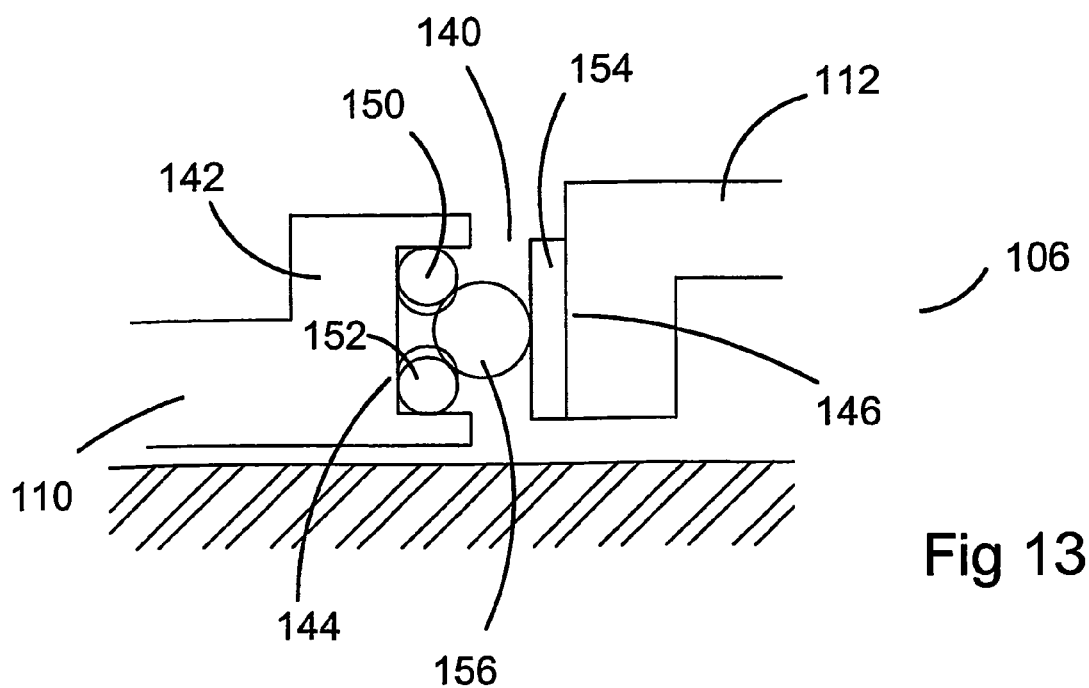
FIG. 13 is a cross section of the rotation adjustment device.

The base plate 10 also enables rotation of its upper plate 112 about the Z axis. A rotation adjustment device 106 is provided for this purpose. A cross section of the rotation adjustment device 106 is shown in FIG. 13.

At the rotation adjustment device 106, the upper plate 112 is provided with a cut out 140 and a portion 142 of the lower plate 110 extends upwards into the space provided by the cut out 140. In this manner the upper and lower plates 112, 110 are provided with adjacent substantially vertical walls 144, 146. As shown in FIG. 13, the substantially vertical wall 144 of the lower plate 110 is provided with a pair of rollers 150, 152. The substantially vertical wall 146 of the upper plate 112 is provided with a plate 154. A ball 156 is in contact with both the pair of rollers 150, 152 and the plate 154. As in the first and second tilt adjusters 100, 102, the rollers 150, 152 are not parallel. If the ball 156 is moved along the rollers 150, 152 towards the narrower end, the ball 156 will be pushed away from the wall 144 of the lower plate 110 and will in turn push away the wall 146 of the upper plate 112. The upper plate 112 is thereby rotated relative to the lower plate 110. By moving the ball 156 in the opposite direction, i.e. towards the wider end, the upper plate 112 will rotate relative to the lower plate 110 in the opposite direction. As before, an adjustment screw 127 is used to alter the position of the ball 156 on the rollers 150, 152.

Figure 14:
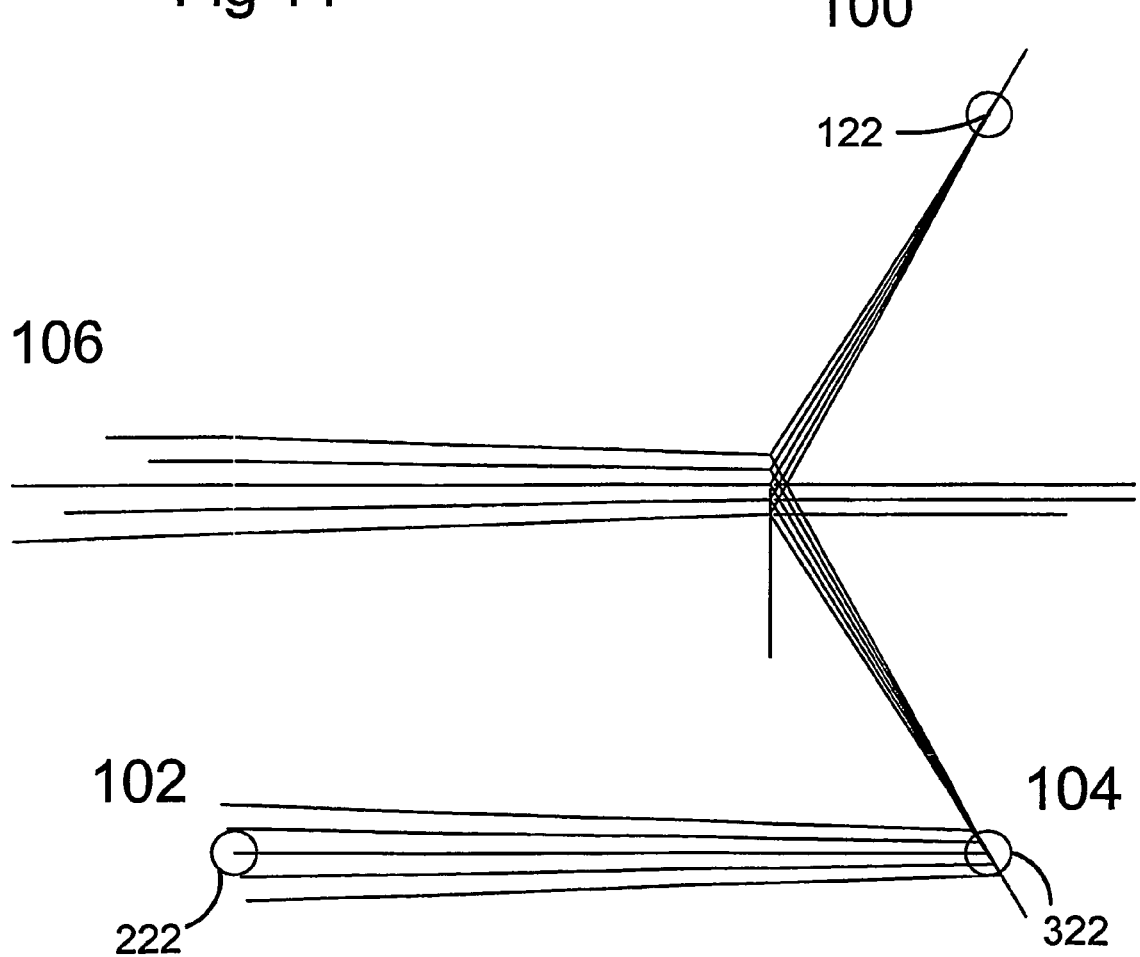
FIG. 14 is a schematic illustration of relative movement of the upper plate of the base plate.

When the upper plate 112 is rotated, it interacts with the balls and rollers in the first and second tilt adjustment devices 100,102 and the third location 104 in the following way. At the first tilt adjustment device 100, the parallel rollers 114, 116 in the upper plate 112 may slide over the ball 122 in the direction of the nominal centre line of the rollers, or may rotate about the ball 122. At the second tilt adjustment device 102, the plate 232 of the upper plate 112 slides over the ball 222 and therefore does not constrain rotational movement of the upper plate 112. At the third location 104, parallel rollers 314, 316 in the upper plate slide over the ball 322 in the direction of the nominal centre line of the rollers or the rollers rotate about the ball 322. FIG. 14 shows the movement of the upper plate 112 about each of the balls 122, 222, 322 of the first and second tilt adjustment devices 100, 102 and the third location 104 during rotation.

As the balls 122, 222 of the first and second tilt adjustment devices 100,102 remain stationary with respect to the rollers 118, 120, 218, 220 in the lower plate 110 and ball 322 of the third location 104 remains stationary with respect to the rollers 314,316 in the upper plate 112, rotation of the upper plate 112 has no effect on the tilt adjustment of the upper plate.

In the above embodiment, the rollers 118, 120 in the lower plate 110 of the first and second tilt adjustment devices 100,102 and the rollers 150, 152 of the rotation adjustment device 106 are non parallel such that one end of each pair is closer together than the other end. This causes the ball as it is moved along the rollers to be raised as it approaches the ends closer together or to be lowered as it approaches the ends further apart.

By varying the angle of the rollers about their nominal centre line, it is possible to vary the amount of the height lift of the ball for a given distance travelled along the rollers. This has the advantage that it is therefore possible to adjust the sensitivity of the base plate by altering the angle of the rollers.

Figure 15:
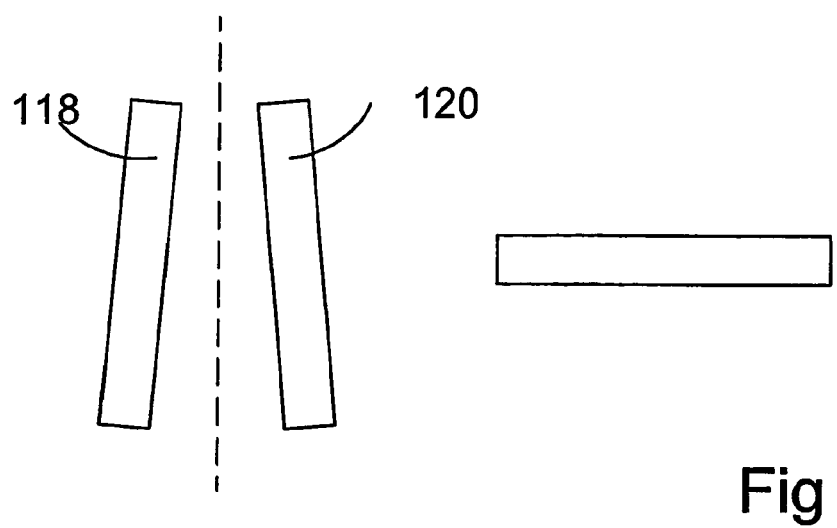
FIG. 15 is a plan and side view of non-parallel rollers.
Figure 16:
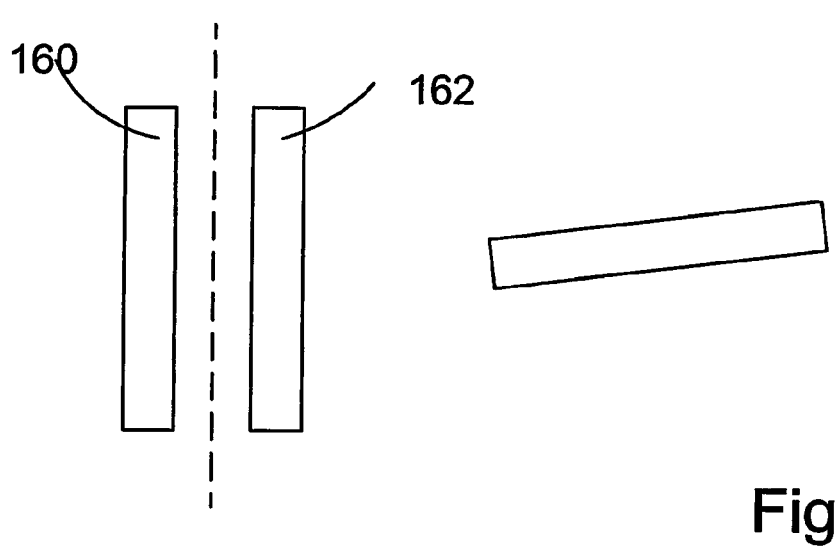
FIG. 16 is a plan and side view of parallel angled rollers.
Figure 17:
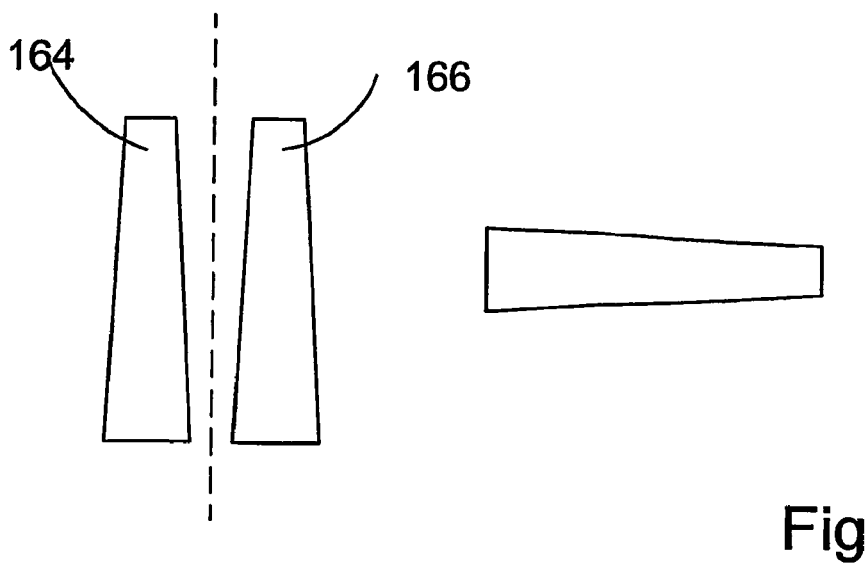
FIG. 17 is a plan and side view of tapered rollers.

FIG. 15 shows a plan view of the non-parallel rollers 118, 120. This effect can be achieved by alternative means, for example as shown in FIG. 16, parallel rollers 160, 162 are set at an angle from the lower plate 110, so that the ball 164 is moved up and down a slope as it is moved along the rollers. FIG. 17 shows a pair of tapered parallel rollers 164, 166 with one end of each roller being wider than the other end.

In an alternative embodiment of the invention, the ball 322 and pairs of parallel rollers 314, 316, 318, 320 located at the third location 104 are replaced with an additional tilt adjustment device, of the same type as the first tilt adjustment device. This enables the height of the upper plate 112 along the Z axis to be altered, as now the height can be individually adjusted about all three tilt adjustment points.

Figure 20:
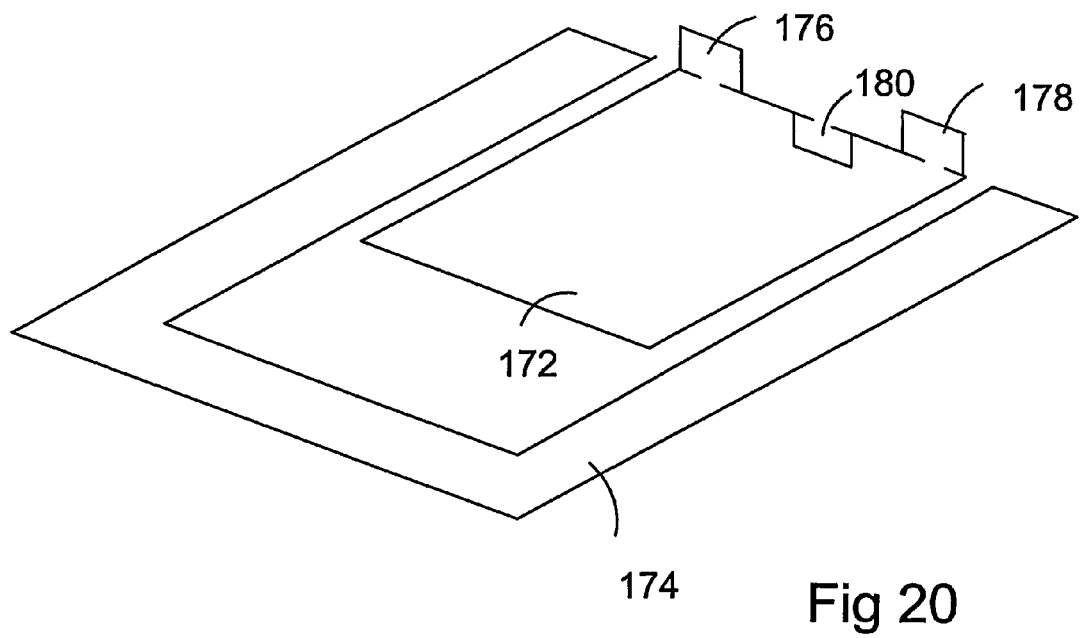
FIG. 20 is a perspective view of the biasing spring of FIG. 18.

In each of the tilt adjustment devices and the rotation adjustment device, the balls are biased towards the adjustment device. FIGS. 18,19 and 20 illustrates the plan, end and perspective views respectively of a spring used to bias the ball towards the adjustment device. The spring 170 comprises a slide 172 which is located between the upper and lower plates 112, 110. A surrounding plate 174 is provided which defines the boundaries of movement of the slide 172. The surrounding plate is attached to the bottom of the upper plate 112. Both the slide 172 and surrounding plate 174 may be made by a chemi-etch process from the same sheet which ensures that they are the same thickness. This ensures good tolerances which provides a good slide mechanism.

One end of the slide 174 is provided with three tabs 176,178,180. One of the tabs 180 protrudes upwards from the middle of the end of the slide 174 and abuts a ball 182 of an adjustment device. The remaining two tabs 176,178 protrudes downwards from either side of the end of the slide 174 and abut springs 184,186 located in channels 188,190 in the upper plate 112. The springs 184,186 extend between one end of the channels 188, 190 and the protruding tabs 176,178 and thereby exert a force to bias the slide 172 towards the adjustment device 192. As the slide 172 is pushed towards the adjustment device 192 by the springs 184, 186, the tab 180 pushes the ball 182 towards the adjustment device 192.

Figure 21:
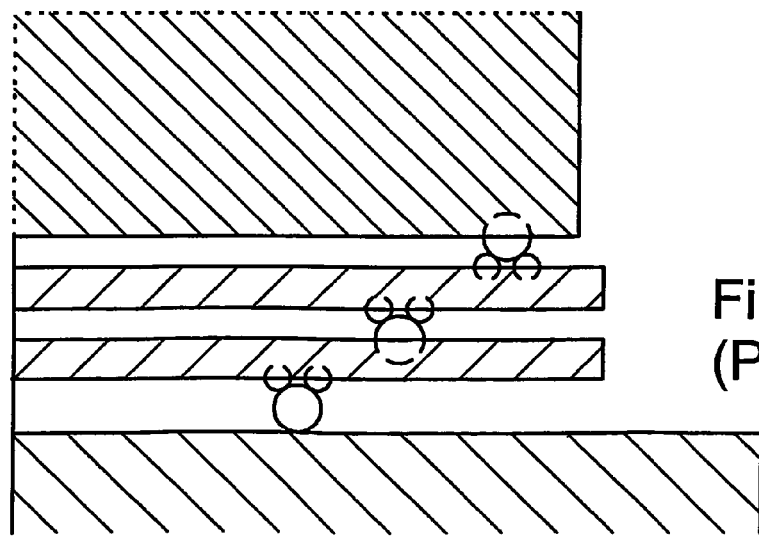
FIG. 21 is a schematic illustration of the arrangement of kinematic elements in a prior art base plate.

An advantage of the adjustable base plate of the present invention is that the balls and rollers are in-line between the table, base plate and source housing, i.e. there is a direct path through the kinematic elements. For example, as shown in FIG. 10, the first tilt adjustment device 100 has a direct path from source housing 20 through kinematic element 128, rollers 114,116, ball 112, rollers 118,120, element 130 to table 11. As shown in FIG. 11, the second tilt adjustment device 102 has a direct path from source housing 20 through kinematic element 228, rollers 214,216, plate 232, ball 222, rollers 218, 220, element 230 to table 11. FIG. 21 illustrates a prior art arrangement in which the kinematics between each part are offset. This has the disadvantage that any distortion of the base plate, e.g. due to thermal bowing, will cause a lever effect on the housing. In the present invention with a direct path through the balls and rollers, distortion of the plate has no effect on the position of the housing. The balls and rollers are made of a hard material such as steel or tungsten carbide.

The invention claimed is:

1. A measuring system for calibrating a machine, the measuring system having at least two housings, comprising:
   a base attachable to a first surface of the machine on which a first housing may be mounted;
   a second housing attachable to a second surface of the machine, said first and second surfaces of the machine being moveable relative to one another;
   said first and second housings each being provided with a complementary part of a first mounting device, such that when the two parts of the first mounting device are connected together, the housings are mutually aligned; and
   wherein at least one surface of the base and at least one surface of the first housing are each provided with a complementary part of a second mounting device, such that when the two parts of the second mounting device are connected together, the first and second housings may be aligned in any of a plurality of predetermined directions without requiring realignment of the first and second housings.

2. A measuring system for calibrating a machine according to claim 1, wherein the first and second housing are urged together by magnets.

3. A measuring system according to claim 1 in which the base is adjustable relative to the first surface of the machine to which it is attached to adjust the relative angle between said base and said first surface.

4. A measuring system for a machine according to claim 1 which the second housing is mounted onto the second surface of the machine via a connecting device and wherein a plurality of surfaces on the second housing and at least one surface on the connecting device are each provided with a complementary part of a third mounting device, such that the second housing may be attached to the connecting device when orientated in any of the plurality of predetermined directions.

5. A measuring system according to claim 4 in which the complementary parts of the third mounting device are arranged such that once the first and second housings have been aligned using the first mounting device, and the first housing and base have been aligned using the second mounting device, the second housing and the connecting device may be connected without realignment of the first and second housing relative to one another being required.

6. A measuring system according to claim 4 in which the geometric combination of the first and second housings and the connecting device is such that the axes along which the first and second housings may be aligned intercept at a common point.

7. A measuring system according to claim 6 in which the geometric combination of the first and second housings is such that the second housing starts in the same position in X,Y,Z, whatever the orientation of the first and second housings.

8. A measuring system according to claim 6 in which the geometric combination of the first and second housings is such that the second housing is moved through the interception of the axes, whatever the orientation of the first and second housings.

* * * * *